United States Patent
Wang et al.

(10) Patent No.: US 10,622,646 B2
(45) Date of Patent: Apr. 14, 2020

(54) FUEL CELL SYSTEM AND SHUTDOWN METHOD THEREOF

(71) Applicant: CUMMINS ENTERPRISE LLC, Indianapolis, IN (US)

(72) Inventors: Honggang Wang, Malta, NY (US); Xiangdong Kong, Shanghai (CN); Andrew Philp Shapiro, Malta, NY (US); Patrick Carroll, Schenectady, NY (US); John Guido Piccirillo, Schenectady, NY (US)

(73) Assignee: Cummins Enterprise LLC, Indianapolis, IN (US)

( * ) Notice: Subject to any disclaimer, the term of this patent is extended or adjusted under 35 U.S.C. 154(b) by 94 days.

(21) Appl. No.: 15/795,084

(22) Filed: Oct. 26, 2017

(65) Prior Publication Data
US 2018/0145351 A1    May 24, 2018

(30) Foreign Application Priority Data
Nov. 22, 2016    (CN) .......................... 2016 1 1041688

(51) Int. Cl.
*H01M 8/04089* (2016.01)
*H01M 8/0612* (2016.01)
(Continued)

(52) U.S. Cl.
CPC ..... *H01M 8/04097* (2013.01); *H01M 8/0491* (2013.01); *H01M 8/04104* (2013.01); *H01M 8/04303* (2016.02); *H01M 8/04559* (2013.01); *H01M 8/04753* (2013.01); *H01M 8/04843* (2013.01); *H01M 8/0618* (2013.01)

(58) Field of Classification Search
None
See application file for complete search history.

(56) References Cited

U.S. PATENT DOCUMENTS

| 6,680,136 B2 | 1/2004 | Mieney et al. |
| 6,709,782 B2 | 3/2004 | Keegan et al. |
| (Continued) | | |

OTHER PUBLICATIONS

A Y Karnik et al., "Control analysis of an ejector based fuel cell anode recirculation system", 2006 American Control Conference, Jun. 14-16, 2006, Minneapolis, MN.
(Continued)

*Primary Examiner* — Daniel S Gatewood
(74) *Attorney, Agent, or Firm* — Barnes & Thornburg LLP

(57) ABSTRACT

A fuel cell system is disclosed, which includes an anode recirculation loop including a fuel cell stack for generating power, a fuel supply device for providing a fuel to the anode recirculation loop, an air supply device for providing air to a cathode of the fuel cell stack, a voltage monitoring device for monitoring a voltage of the fuel cell stack, and an anode protection controller. The anode protection controller decreases a current drawn from the fuel cell stack by a predetermined amount whenever the voltage of the fuel cell stack drops below a predetermined voltage threshold and decreases a fuel flowrate provided to the anode recirculation loop based on the decreased current, so as to maintain a steam to carbon ratio in the anode recirculation loop above a predetermined steam to carbon ratio limit. A shutdown method for the fuel cell system are also disclosed.

12 Claims, 7 Drawing Sheets

(51) Int. Cl.
    *H01M 8/04828* (2016.01)
    *H01M 8/04303* (2016.01)
    *H01M 8/04537* (2016.01)
    *H01M 8/04746* (2016.01)
    *H01M 8/04858* (2016.01)

(56) References Cited

U.S. PATENT DOCUMENTS

| | | |
|---|---|---|
| 7,435,490 B2 | 10/2008 | England et al. |
| 7,846,599 B2 | 12/2010 | Ballantine et al. |
| 8,034,499 B2 | 10/2011 | Grieve et al. |
| 8,722,270 B2 | 5/2014 | Pastula et al. |
| 8,790,837 B2 | 7/2014 | Hatada |
| 8,841,039 B2 | 9/2014 | Sugiura |
| 8,920,993 B2 | 12/2014 | Li et al. |
| 8,986,405 B2 | 3/2015 | Modarresi |
| 9,005,827 B2 | 4/2015 | Nedergaard Clausen et al. |
| 9,040,206 B2 | 5/2015 | Hatada |
| 2002/0028362 A1 | 3/2002 | Prediger et al. |
| 2014/0295303 A1 | 10/2014 | Matsuo et al. |
| 2015/0044587 A1 | 2/2015 | Matsuo et al. |
| 2015/0064586 A1 | 3/2015 | Matsuo et al. |
| 2015/0086887 A1 | 3/2015 | Matsuo et al. |
| 2015/0147665 A1 | 5/2015 | Ruokomaki |

OTHER PUBLICATIONS

Guo et al., "Air flow control based on optimal oxygen excess ratio in fuel cells for vehicles", Journal of Modern Transportation, vol. 21, Issue: 2, pp. 79-85, Jun. 2013.

FUEL CELL SYSTEM AND SHUTDOWN METHOD THEREOF

BACKGROUND OF THE INVENTION

This disclosure relates generally to the fuel cell field, and more particularly to a fuel cell system with anode protection and a shutdown method for the fuel cell system.

Fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems are being widely developed as an energy supply system because fuel cells are environmentally superior and highly efficient. To improve system efficiency and fuel utilization and reduce external water usage, the fuel cell system usually includes an anode recirculation loop. As single fuel cell can only generate 1V voltage, therefore, a plurality of fuel cells are usually stacked together (usually referred to as a fuel cell stack) to get desired voltage.

An anode of a typical solid oxide fuel cell (SOFC) is commonly made of a nickel/yttria-stabilized zirconia (Ni/YSZ) cermet. Nickel in the anode serves as a catalyst for fuel oxidation and current conductor. During normal operation of the fuel cell system, SOFC stacks are typically operated at above 700° C., and the nickel (Ni) in the anode remains in its reduced form due to the continuous supply of primarily hydrogen fuel gas.

However, for example, when crossover or overboard leakage occurs in the fuel cell stack, if the reducing gas is not adequate in the anode, the Ni in the anode may undergo a re-oxidation, where the Ni may react with the oxygen in the air diffused from the cathode layer or introduced into the anode chamber to form nickel oxide (NiO) at temperatures above approximately 350° C. The formation of NiO in the microstructure of the anode may result in volumetric expansion of the anode layer, which exerts stress on the overall SOFC structure. During rapid oxidation, the electrolyte is unable to expand as fast as the forming nickel oxide, resulting in the potential to crack the electrolyte. This will allow the fuel and oxidant gases to mix directly, which may lead to catastrophic results if the fuel cell temperature is above the auto-ignition temperature of the fuel.

In a laboratory setting, the SOFC stack may be protected from re-oxidation using a supply of reducing gas, which is typically a dilute mixture of hydrogen in nitrogen gas. This can be used to purge the anode chamber during SOFC shutdown or standby conditions to prevent re-oxidation of the anode. A typical SOFC stack requires usually between four to twelve hours cooling from its operating temperature to a temperature below which there is no significant damage to the anode material can occur. During this time, it will require a large amount of reducing gas and frequent bottle changes to meet the reducing gas consumption demand.

Furthermore, during shutdown process with fuel cell stack leakage, there is a tendency for carbon formation and deposition on anode electrodes. The carbon could be formed by hydrocarbon cracking, Boudouard reaction or carbon monoxide (CO) reduction. The carbon could be removed by introducing steam to the fuel cell system which leads to CO and Hydrogen at certain conditions. The carbon will be deposited if the carbon formation rate is faster than the carbon removal rate. Internal carbon formation and deposition results in decreased efficiency of the anode, reduced useful device lifetime and forced shutdown of the system.

Therefore, there is a need for an improved fuel cell system to prevent the oxidation of nickel and carbon deposition in the anode of the fuel cell stack during shutdown operation. There is a further need for this system to be economical to install and operate.

BRIEF DESCRIPTION OF THE INVENTION

In one embodiment, the present disclosure provides a fuel cell system. The fuel cell system comprises an anode recirculation loop, a fuel supply device, an air supply device, a voltage monitoring device and an anode protection controller. The anode recirculation loop comprises a fuel cell stack configured for generating power and having an anode and a cathode. The fuel supply device is configured for providing a fuel to the anode recirculation loop. The air supply device is configured for providing air to the cathode of the fuel cell stack. The voltage monitoring device is configured for monitoring a voltage of the fuel cell stack. The anode protection controller decreases a current drawn from the fuel cell stack by a predetermined amount whenever the voltage of the fuel cell stack drops below a predetermined voltage threshold and decreases a fuel flowrate of the fuel provided to the anode recirculation loop based on the decreased current, so as to maintain a steam to carbon ratio in the anode recirculation loop above a predetermined steam to carbon ratio limit.

In another embodiment, the present disclosure provides a shutdown method for a fuel cell system which comprises an anode recirculation loop having a fuel cell stack for generating power. The shutdown method comprises: monitoring a voltage of the fuel cell stack; whenever the voltage of the fuel cell stack drops below a predetermined voltage threshold, decreasing a current drawn from the fuel cell stack by a predetermined amount; and decreasing a fuel flowrate of a fuel provided to the anode recirculation loop based on the decreased current so as to maintain a steam to carbon ratio in the anode recirculation loop above a predetermined steam to carbon ratio limit.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described herein below with reference to the accompanying drawings.

In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", "third" and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. In addition, the terms "connected" and "coupled" are not restricted to physical or mechanical connections or couplings, and can include electrical connections or couplings, whether direct or indirect.

Fuel Cell System with Anode Recirculation Loop

Figure 1:
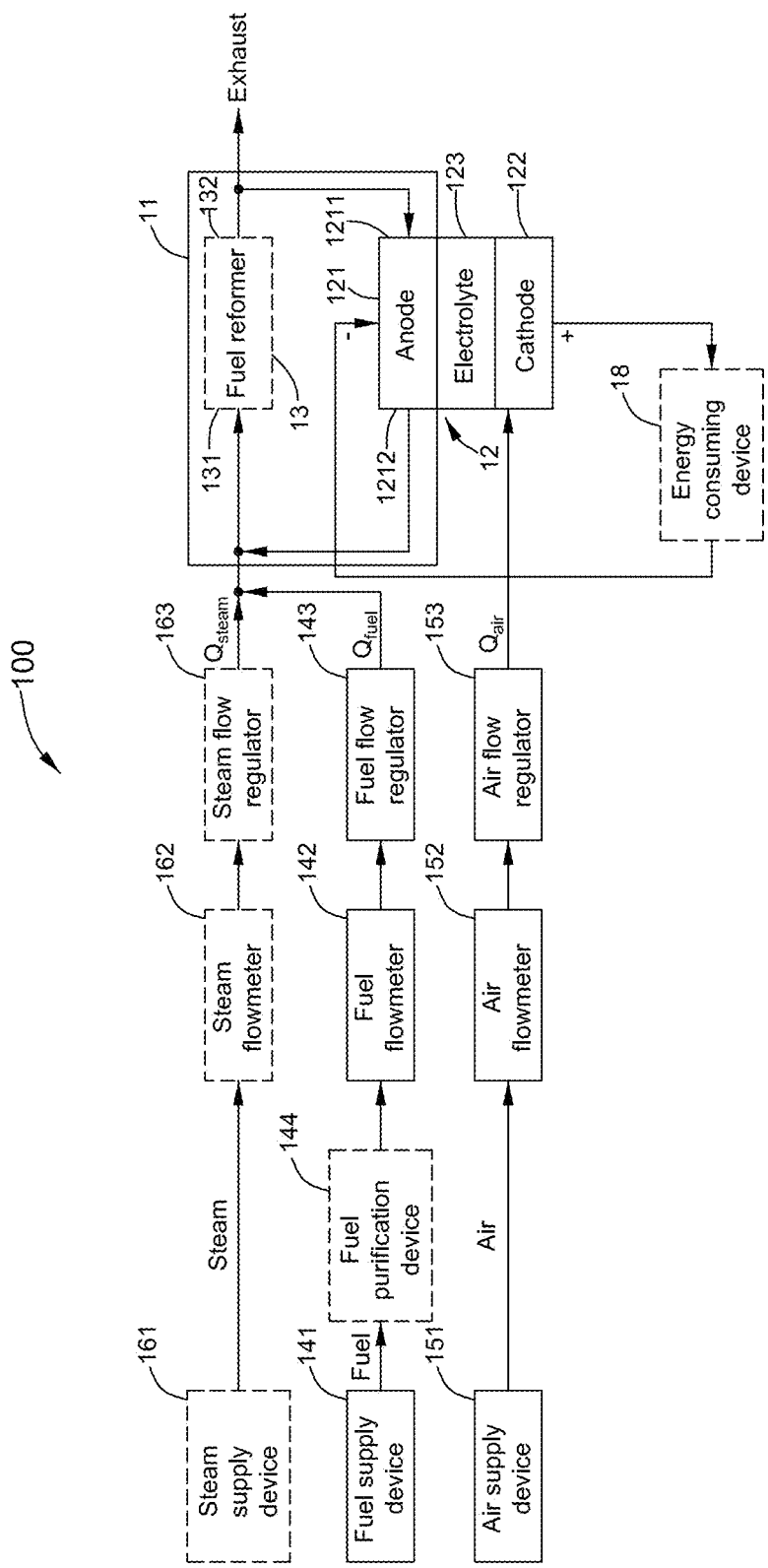
FIG. 1 is a schematic block diagram of an exemplary fuel cell system with an anode recirculation loop.

FIG. 1 illustrates a schematic block diagram of an exemplary fuel cell system 100. As shown in FIG. 1, the exemplary fuel cell system 100 includes an anode recirculation loop 11. The anode recirculation loop 11 includes a fuel cell stack 12 for generating power. The fuel cell stack 12 may include a plurality of fuel cells which are stacked together. The fuel cells may for example include, but are not limited to solid oxide fuel cells (SOFCs). In fact, the fuel cells may be any fuel cell using nickel-based material as anode material.

The fuel cell stack 12 includes an anode 121, a cathode 122, and an electrolyte 123. The anode 121 of the fuel cell stack 12 has an anode inlet 1211 and an anode outlet 1212.

The anode 121 may support electrochemical reactions that generate electricity. A fuel may be oxidized in the anode 121 with oxygen ions received from the cathode 122 via diffusion through the electrolyte 123. The reactions may create heat, steam and electricity in the form of free electrons in the anode 121, which may be used to supply power to an energy consuming device 18. The oxygen ions may be created via an oxygen reduction of a cathode oxidant using the electrons returning from the energy consuming device 18 into the cathode 122.

The energy consuming device 18 is adapted to draw an electric current from, or apply an electrical load to, the fuel cell stack 12. The energy consuming device 18 may include, but should not be limited to, tools, lights or lighting assemblies, appliances (such as household or other appliances), households or other dwellings, offices or other commercial establishments, computers, signaling or communication equipment, etc.

The cathode 122 may be coupled to a source of the cathode oxidant, such as oxygen in the atmospheric air. The cathode oxidant is defined as the oxidant that is supplied to the cathode 122 employed by the fuel cell system 100 in generating electrical power. The cathode 122 may be permeable to the oxygen ions received from the cathode oxidant.

The electrolyte 123 may be in communication with the anode 121 and the cathode 122. The electrolyte 123 may pass the oxygen ions from the cathode 122 to the anode 121, and may have little or no electrical conductivity, so as to prevent passage of the free electrons from the cathode 122 to the anode 121.

With continued reference to FIG. 1, the fuel cell system 100 may include a fuel supply device 141 for providing a fuel to the anode recirculation loop 11, and an air supply device 151 for providing air to the cathode 122 of the fuel cell stack 12. The fuel may be for example a hydrocarbon fuel such as natural gas, methane ($CH_4$) and the like. The fuel cell system 100 may further include a fuel flowmeter 142 for measuring a fuel flowrate $Q_{fuel}$ of the fuel provided to the anode recirculation loop 11 and a fuel flow regulator 143 for regulating the fuel flowrate $Q_{fuel}$ provided to the anode recirculation loop 11, as well as an air flowmeter 152 for measuring an air flowrate $Q_{air}$ of the air provided to the cathode 122, and an air flow regulator 153 for regulating the air flowrate $Q_{air}$ provided to the cathode 122.

In order to reduce or remove undesirable components such as sulphur in the fuel, which tends to deactivate catalysts used in the back-end fuel reforming, the fuel cell system 100 may further include a fuel purification device 144. However, the fuel purification device 144 may be omitted for pure fuel, for example methane ($CH_4$).

Therefore, the fuel provided to the anode recirculation loop 11 may include the fuel provided by the fuel supply device 141 or the fuel purified by the fuel purification device 144.

Optionally, the fuel cell system 100 may further include a steam supply device 161 for supplying steam for fuel reforming to the anode recirculation loop 11, a steam flowmeter 162 for measuring a steam flowrate $Q_{steam}$ of the steam provided to the anode recirculation loop 11 and a steam flow regulator 163 for regulating the steam flowrate $Q_{steam}$ provided to the anode recirculation loop 11.

In one embodiment, as shown in FIG. 1, the anode recirculation loop 11 may further include a fuel reformer 13. The fuel reformer 13 has a reformer inlet 131 and a reformer outlet 132. The anode outlet 1212 of the fuel cell stack 12 may be coupled to the reformer inlet 131 of the fuel reformer 13, and the reformer outlet 132 of the fuel reformer 13 is returned to the anode inlet 1211 of the fuel cell stack 12 so as to form the anode recirculation loop 11.

The fuel reformer 13 may receive the fuel (or combination of the fuel and the steam in the case of supplying steam), and a tail gas from the anode outlet 1212 of the fuel cell stack 12 and to generate a reformate at the reformer outlet 132. The reformate includes hydrogen ($H_2$) rich gas, and may also include carbon monoxide (CO), carbon dioxide ($CO_2$), steam ($H_2O$), and fuel slip, such as methane ($CH_4$). At least one portion (also called as a recirculated reformate) of the reformate at the reformer outlet 132 may be returned to the anode inlet 1211 and the remainder may be discharged as an exhaust.

When the fuel cell system 100 is in operation, the fuel, for example methane ($CH_4$) is supplied to the anode recirculation loop 11, particularly the reformer inlet 131 of the fuel reformer 13 in this embodiment, and oxygen, for example the oxygen contained in the air, is supplied to the cathode 122 of the fuel cell stack 12. In the fuel reformer 13, the fuel may be reformed to generate hydrogen through chemical reaction. For example, methane ($CH_4$) is converted into carbon monoxide (CO) and hydrogen ($H_2$) by the following fuel reforming reaction (1), and carbon monoxide and steam ($H_2O$) is converted into carbon dioxide ($CO_2$) and hydrogen by the following water gas shifting reaction (2).

$$CH_4 + H_2O \rightarrow CO + 3H_2 \quad (1)$$

$$CO + H_2O \rightarrow CO_2 + H_2 \quad (2)$$

The recirculated reformate is returned to the anode inlet 1211 of the fuel cell stack 12. In the anode 121 of the fuel cell stack 12, the recirculated reformate and the oxygen ions from the cathode 122 are mixed, and are converted into steam through the following electro-chemical reaction (3) so as to generate power and heat.

In another embodiment, the fuel cell stack 12 may have internal reforming function without the separate fuel reformer 13. Under such the circumstance, the anode outlet 1212 of the fuel cell stack 12 may be directly returned to the anode inlet 1211 so as to form the anode recirculation loop 11. Thus, in the anode 121 of the fuel cell stack 12, the fuel reforming reaction (1) and the water gas shifting reaction (2) above will also occur.

Fuel Cell System With Anode Protection

Figure 2:
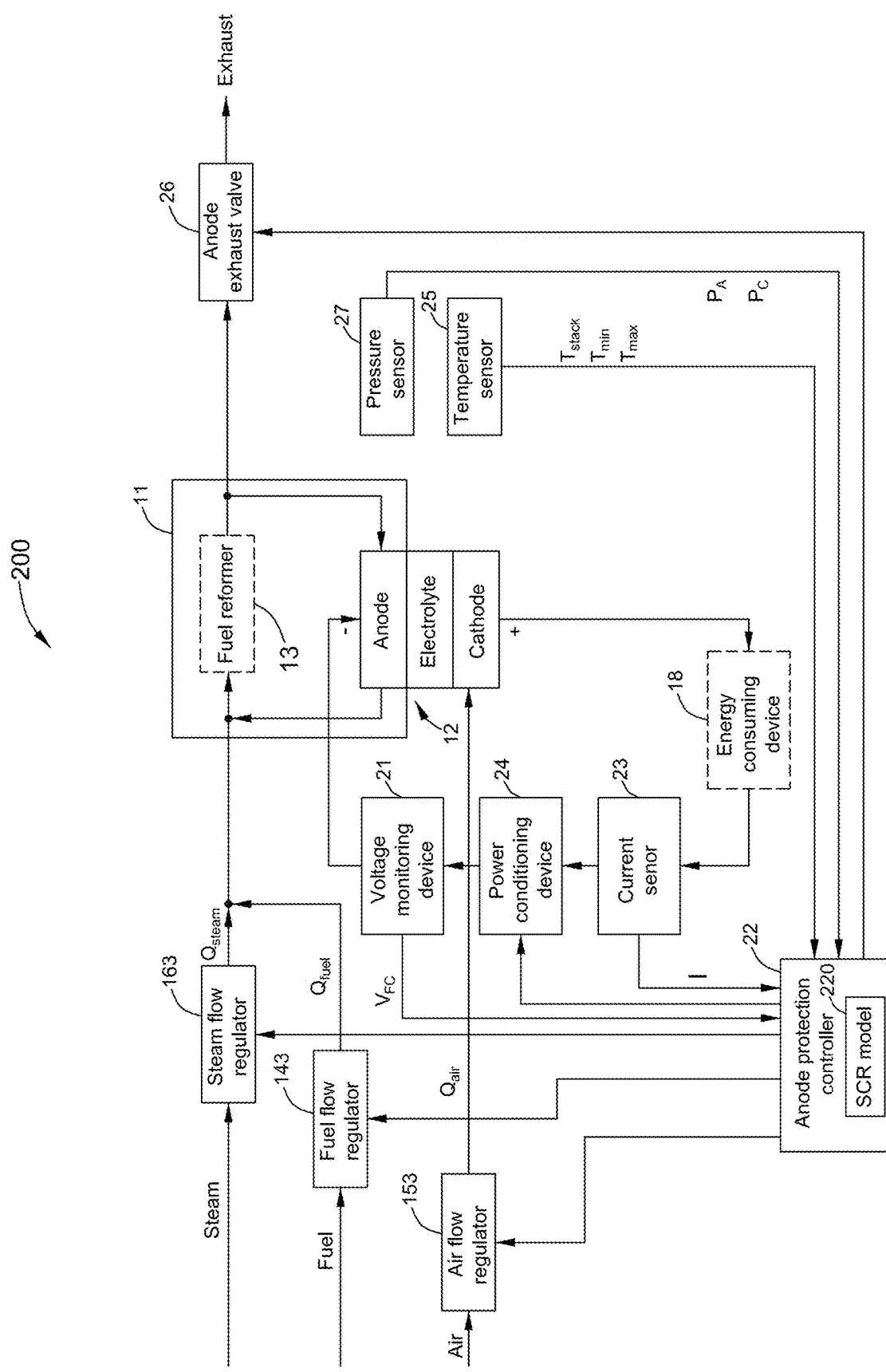
FIG. 2 is a schematic block diagram of a fuel cell system with anode protection in accordance with an embodiment of the present disclosure.

FIG. 2 illustrates a schematic block diagram of a fuel cell system 200 with anode protection in accordance with an embodiment of the present disclosure. As shown in FIG. 2, in comparison to the fuel cell system 100 of FIG. 1, the fuel cell system 200 in accordance with an embodiment of the present disclosure may further include a voltage monitoring device 21. The voltage monitoring device 21 may monitor a voltage $V_{FC}$ of the fuel cell stack 12 in real time. During shutdown of the fuel cell system 200, the voltage $V_{FC}$ of the fuel cell stack 12 may decrease due to declining temperature of the fuel cell stack 12, or deteriorated crossover or overboard leakage in the fuel cell stack 12. At a predetermined operating condition of the fuel cell system 200, the voltage $V_{FC}$ of the fuel cell stack 12 may be an indicator for health status of the anode 121 of the fuel cell stack 12. Once the voltage $V_{FC}$ of the fuel cell stack 12 is below a predetermined voltage threshold $V_{th}$, which indicates the oxidation of anode 121 of the fuel cell stack 12. The predetermined voltage threshold $V_{th}$ may correlate to the nickel-nickel oxide equilibrium with an operating margin. For example, the predetermined voltage threshold $V_{th}$ may range from 0.55V to 0.65V. Optionally, the predetermined voltage threshold $V_{th}$ may be 0.63V.

Thus, in order to prevent the anode 121 of the fuel cell stack 12 from oxidation, the fuel cell system 200 of the present disclosure may further include an anode protection controller 22. The voltage monitoring device 21 may be communicatively connected with the anode protection controller 22 and send the monitored voltage $V_{FC}$ of the fuel cell stack 12 to the anode protection controller 22. The predetermined voltage threshold $V_{th}$ may be saved in advance in the anode protection controller 22. The anode protection controller 22 may decrease a current I drawn from the fuel cell stack 12 by a predetermined amount $\Delta I$ whenever the voltage $V_{FC}$ of the fuel cell stack 12 drops below the predetermined voltage threshold $V_{th}$, and decrease the fuel flowrate $Q_{fuel}$ provided to the anode recirculation loop 11 based on the decreased current, so as to maintain a steam to carbon ratio (SCR) in the anode recirculation loop 11 above a predetermined steam to carbon ratio (SCR) limit $SCR_{limit}$.

The predetermined amount $\Delta I$ may be for example 5A. The SCR in the anode recirculation loop 11 may include the SCR at the reformer inlet 131 or the SCR at the anode inlet 1211. The SCR may be defined as a ratio of steam content contained in a gas mixture to the sum of carbon monoxide (CO) content and methane ($CH_4$) content contained in the gas mixture. The predetermined SCR limit $SCR_{limit}$ may be saved in advance in the anode protection controller 22. The predetermined SCR limit $SCR_{limit}$ may be a desired or target value, for example 2.55. Alternatively, the predetermined SCR limit $SCR_{limit}$ may be a desired or target range, and illustrative, non-exclusive examples of such the predetermined SCR limit $SCR_{limit}$ may include between 2:1 and 5:1.

The more details about the SCR in the anode recirculation loop 11 may refer to Chinese Patent Application No. 201510962881.X, contents of which are incorporated hereby by reference.

In the fuel cell system 200 of the present disclosure, by monitoring the voltage $V_{FC}$ of the fuel cell stack 12, once the voltage $V_{FC}$ of the fuel cell stack 12 drops below the predetermined voltage threshold $V_{th}$, the voltage $V_{FC}$ of the fuel cell stack 12 may be increased by decreasing the current I by the predetermined amount $\Delta I$ so as to maintain the voltage $V_{FC}$ of the fuel cell stack 12 above the predetermined voltage threshold $V_{th}$, and meanwhile, the fuel flowrate $Q_{fuel}$ may be correspondingly decreased based on the decreased current so as to control the SCR in the anode recirculation loop 11. Therefore, by the real time monitoring of the voltage $V_{FC}$ of the fuel cell stack 12 and the controlling of the anode protection controller 22, the fuel cell system 200 of the present disclosure may effectively protect the anode 121 of the fuel cell stack 12 from oxidation and prevent carbon deposition.

Without using any additional gas supply such as ammonia based reducing gas or hydrogen cylinders to prevent re-oxidation of the nickel in the anode 121, the fuel cell system 200 of the present disclosure may only use the existing fuel supply device 141 which is used in normal operation of the fuel cell stack 12. The fuel cell system 200 of the present disclosure may be economical to install and operate.

With continued reference to FIG. 2, in the fuel cell system 200, the fuel flow regulator 143 may be communicatively connected with the anode protection controller 22. The anode protection controller 22 may control the fuel flow regulator 143 to regulate the fuel flowrate $Q_{fuel}$ provided to the anode recirculation loop 11. The fuel cell system 200 may further include a current sensor 23 for measuring the current I drawn from the fuel cell stack 12 and a power conditioning device 24 for regulating the current I drawn from the fuel cell stack 12. For example, the power conditioning device 24 may include a DC-DC converter, a DC-AC inverter, or the combination of the DC-DC converter and DC-AC inverter. The current sensor 23 and the power conditioning device 24 may be communicatively connected with the anode protection controller 22. The current sensor 23 may send the measured current I drawn from the fuel cell stack 12 to the anode protection controller 22. The anode protection controller 22 may control the power conditioning device 24 to regulate the current I drawn from the fuel cell stack 12 in response to the monitored voltage $V_{FC}$ of the fuel cell stack 12.

After the current I drawn from the fuel cell stack 12 is decreased by the predetermined amount $\Delta I$, the voltage $V_{FC}$ of the fuel cell stack 12 may be increased accordingly. When the voltage $V_{FC}$ of the fuel cell stack 12 is larger than or equal to the predetermined voltage threshold $V_{th}$, if at this time, the current I is still larger than the predetermined amount $\Delta I$, the anode protection controller 22 may take no action and only wait until the voltage $V_{FC}$ of the fuel cell stack 12 drops below the predetermined voltage threshold $V_{th}$. When the current I is less than or equal to the predetermined amount $\Delta I$, the anode protection controller 22 may control the power conditioning device 24 to set the current I to be zero.

In the fuel cell system 200 with the steam supply device 161, the steam flow regulator 163 may be communicatively connected with the anode protection controller 22. In one embodiment, whenever the voltage $V_{FC}$ of the fuel cell stack 12 drops below the predetermined voltage threshold $V_{th}$, the steam flowrate $Q_{steam}$ supplied to the anode recirculation loop 11 may be kept constant. In another embodiment, if the steam supply device 161 may supply sufficient steam, the anode protection controller 22 may further control the steam flow regulator 163 to increase the steam flowrate $Q_{steam}$ supplied to the anode recirculation loop 11 whenever the voltage $V_{FC}$ of the fuel cell stack 12 drops below the predetermined voltage threshold $V_{th}$. That is to say, the SCR in the anode recirculation loop 11 may be maintained above the predetermined SCR limit $SCR_{limit}$ by both decreasing the fuel flowrate $Q_{fuel}$ and increasing the steam flowrate $Q_{steam}$.

The fuel cell system 200 may further include a temperature sensor 25. The temperature sensor 25 may be communicatively connected with the anode protection controller 22. The temperature sensor 25 may measure a temperature $T_{stack}$ of the fuel cell stack 12, and a minimal temperature $T_{min}$ and a maximal temperature $T_{max}$ in the anode recirculation loop 11 and send the measured temperatures $T_{stack}$, $T_{min}$ and $T_{max}$ to the anode protection controller 22.

Returning to FIG. 2, the fuel cell system 200 may further include an anode exhaust valve 26 and a pressure sensor 27. The anode exhaust valve 26 and the pressure sensor 27 may be communicatively connected with the anode protection controller 22. The pressure sensor 22 may measure a pressure $P_A$ in the anode 121 and a pressure $P_C$ in the cathode 122, and send the measured pressures $P_A$, $P_C$ to the anode protection controller 22. The anode protection controller 22 may further control the anode exhaust valve 26 to maintain a differential pressure between the anode 121 and the cathode 122 in a predetermined pressure range whenever the voltage $V_{FC}$ of the fuel cell stack 12 drops below the predetermined voltage threshold $V_{th}$. For example, the predetermined pressure range may be above 3 kpa.

Referring to FIG. 2, the anode protection controller 22 may include a steam to carbon ratio (SCR) model 220. The anode protection controller 22 may determine a decreased fuel flowrate demand from the SCR model 220 according to the decreased current and control the fuel flow regulator 143 to decrease the fuel flowrate $Q_{fuel}$ in response to the decreased fuel flowrate demand. The SCR model 220 may be a look-up table, linear equation, nonlinear equations, computer simulation toolkit or the like.

Figure 3:
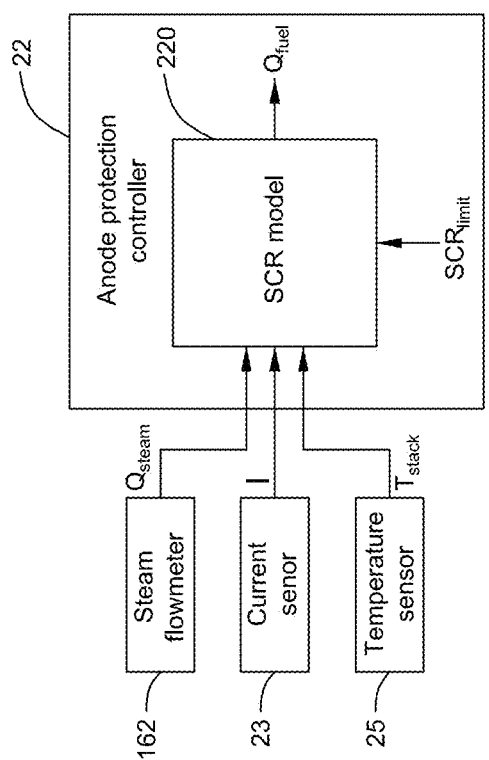
FIG. 3 is a schematic diagram of a SCR model in accordance with an embodiment of the present disclosure.

The SCR model 220 may define relationship which maps the SCR in the anode recirculation loop 11 from the fuel flowrate $Q_{fuel}$ provided to the anode recirculation loop 11, the steam flowrate $Q_{steam}$ supplied to the anode recirculation loop 11, the current I drawn from the fuel cell stack 12, and the temperature $T_{stack}$ of the fuel cell stack 12. With reference to FIG. 3, in the SCR model 220, the steam flowrate $Q_{steam}$ supplied to the anode recirculation loop 11, the current I drawn from the fuel cell stack 12, the temperature $T_{stack}$ of the fuel cell stack 12 and the SCR in the anode recirculation loop 11 may be used as input variables of the SCR model 220, and the fuel flowrate $Q_{fuel}$ provided to the anode recirculation loop 11 may be used as an output variable of the SCR model 220. In this embodiment, the SCR model 220 may receive the steam flowrate $Q_{steam}$ measured from the steam flowmeter 162, the decreased current measured from the current sensor 23, the temperature $T_{stack}$ of the fuel cell stack 12 measured from the temperature sensor 25 and the predetermined SCR limit $SCR_{limit}$, and output the decreased fuel flowrate demand.

SCR Model Prediction

Hereinafter, parameter relationship prediction in the SCR model 220 will be given in detail taking methane ($CH_4$) as an illustrative example of the fuel and in the condition that the number of the fuel cell stack 12 is four with combined reference to FIG. 4.

In the first case, if the temperature of the fuel cell stack 12, $T_{stack}<500°$ C., the steam to carbon ratio (SCR) equation in the SCR model 220 can be obtained as follows:

$$SCR = 1.2444 \times \frac{Q_{H_2O}}{Q_{CH_4} + eps} \quad (4)$$

Wherein in equation (4) above, SCR represents the steam to carbon ratio in the anode recirculation loop 11, $Q_{H_2O}$ represents the steam flowrate supplied to the anode recirculation loop 11 with unit of gram per minute (g/min), $Q_{CH_4}$ represents the methane flowrate provided to the anode recirculation loop 11 with unit of standard liter per minute (slpm) and eps represents a very small value, for example 0.0001 for purpose of avoiding the denominator in equation (4) is zero.

In the second case, if the temperature of the fuel cell stack 12, $T_{stack}>500°$ C. and if the current drawn from the fuel cell stack 12, I=0 and the steam flowrate supplied to the anode recirculation loop 11, $Q_{H_2O}>0$, the steam to carbon ratio (SCR) equation in the SCR model 220 can be obtained as follows:

$$SCR = 4.86 + 0.0413 \times Q_{H_2O} - 0.0993 \times Q_{CH_4} - 0.00267 \times T_{stack} - 0.00018 \times Q_{CH_4} \times Q_{H_2O} + 0.000432 \times Q_{CH_4} \times Q_{CH_4} \quad (5)$$

In the third case, if the temperature of the fuel cell stack 12, $T_{stack}>500°$ C. and if the current drawn from the fuel cell stack 12, I>0 and the steam flowrate supplied to the anode recirculation loop 11, $Q_{H_2O}>0$, the steam to carbon ratio (SCR) equation in the SCR model 220 can be obtained as follows:

$$SCR = -6.47 + 14.7 \times UF_{sys} + 3.8 \times \frac{Q_{H_2O}}{Q_{CH_4}} \quad (6)$$

$$UF_{sys} = \frac{\sum_{i=1}^{4} I_i \times N_i}{\frac{8F}{Q_{CH_4}}} \quad (7)$$

$$F = 96485 C/\text{mol} \quad (8)$$

Wherein in equations (6)-(8) above, $UF_{sys}$ represents a fuel utilization of the fuel cell system 200, $I_i$ represents the current drawn from the $i^{th}$ fuel cell stack, $N_i$ represents the number of the fuel cells in the $i^{th}$ fuel cell stack, and F represents the Faraday constant.

In the fourth case, if the temperature of the fuel cell stack 12, $T_{stack}>500°$ C. and if the current drawn from the fuel cell stack 12, I>0 and the steam flowrate supplied to the anode recirculation loop 11, $Q_{H_2O}=0$, the steam to carbon ratio (SCR) equation in the SCR model 220 can be obtained as follows:

$$SCR = -8.98 + 19.1 \times UF_{sys} \quad (9)$$

Thus, as long as the steam flowrate $Q_{H_2O}$ supplied to the anode recirculation loop 11, the decreased current drawn from every fuel cell stack 12 and the temperature $T_{stack}$ of the fuel cell stack 12 are measured, and the SCR limit $SCR_{limit}$ is predetermined, the decreased fuel flowrate demand may be easily determined according to the equations above.

Figure 4:
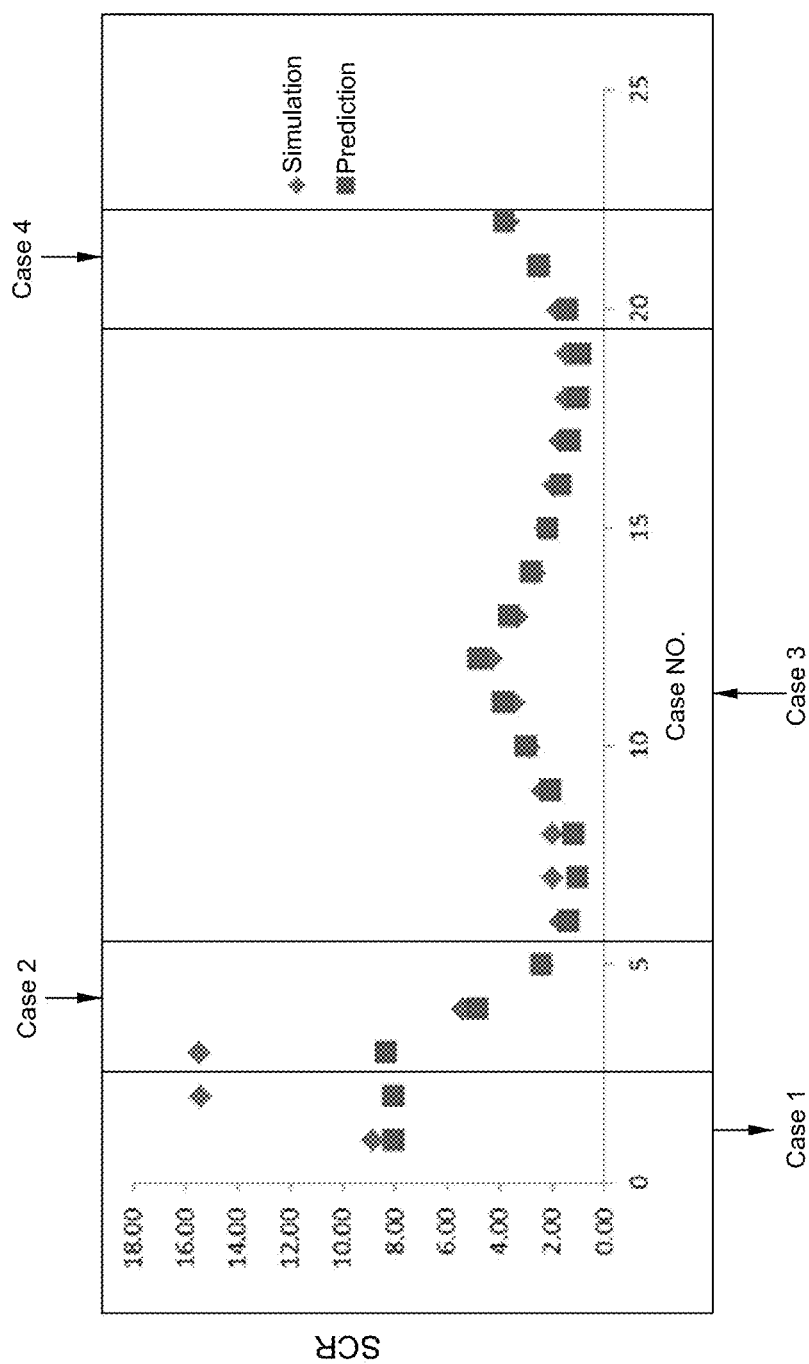
FIG. 4 is a validation of equations in the SCR model of FIG. 3.

Referring to the two dot lines of FIG. 4, the effectiveness of the equations above can be demonstrated by comparative tests against a high fidelity first-principle computer model. In FIG. 4, one dot line represents the SCRs in the anode recirculation loop 11 simulated from the high fidelity first-principle computer model for cases 1-4, and the other dot line represents the SCRs in the anode recirculation loop 11 predicted from equations (4)-(9) above for cases 1-4. It can be seen from FIG. 4, the comparative result indicates that the prediction from equations (4)-(9) above may agree well with the simulation from the high fidelity first-principle computer model for cases 1-4.

Although the equations above are obtained using $CH_4$ as the fuel through a lot of testing data, for other fuels, only a part of parameters has to be modified in the equations above and the overall framework of the SCR model 220 will still hold. Therefore, it can be concluded that the SCR model 220 may at least include the following general parameter relationships.

When the temperature $T_{stack}$ of the fuel cell stack 12 is lower than a predetermined temperature, the SCR in the anode recirculation loop 11 in the SCR model 220 is in association with the fuel flowrate $Q_{fuel}$ provided to the anode recirculation loop 11 and the steam flowrate $Q_{steam}$ supplied to the anode recirculation loop 11.

When the temperature $T_{stack}$ of the fuel cell stack 12 is higher than the predetermined temperature, if the current I drawn from the fuel cell stack 12 is zero and the steam flowrate $Q_{steam}$ supplied to the anode recirculation loop 11 is larger than zero, the SCR in the anode recirculation loop 11 in the SCR model 220 is in association with the fuel flowrate $Q_{fuel}$ provided to the anode recirculation loop 11, the steam flowrate $Q_{steam}$ supplied to the anode recirculation loop 11 and the temperature $T_{stack}$ of the fuel cell stack 12.

When the temperature $T_{stack}$ of the fuel cell stack 12 is higher than the predetermined temperature, if the current I drawn from the fuel cell stack 12 is larger than zero and the steam flowrate $Q_{steam}$ supplied to the anode recirculation loop 11 is larger than zero, the SCR in the anode recirculation loop 11 in the SCR model 220 is in association with the fuel flowrate $Q_{fuel}$ provided to the anode recirculation loop 11, the steam flowrate $Q_{steam}$ supplied to the anode recirculation loop 11 and the current I drawn from the fuel cell stack 12.

When the temperature $T_{stack}$ of the fuel cell stack 12 is higher than the predetermined temperature, if the current I drawn from the fuel cell stack 12 is larger than zero and the steam flowrate $Q_{steam}$ supplied to the anode recirculation loop 11 is zero, the SCR in the anode recirculation loop 11 in the SCR model 220 is in association with the fuel flowrate $Q_{fuel}$ provided to the anode recirculation loop 11 and the current I drawn from the fuel cell stack 12.

Shutdown Method for Fuel Cell System

Figure 5:
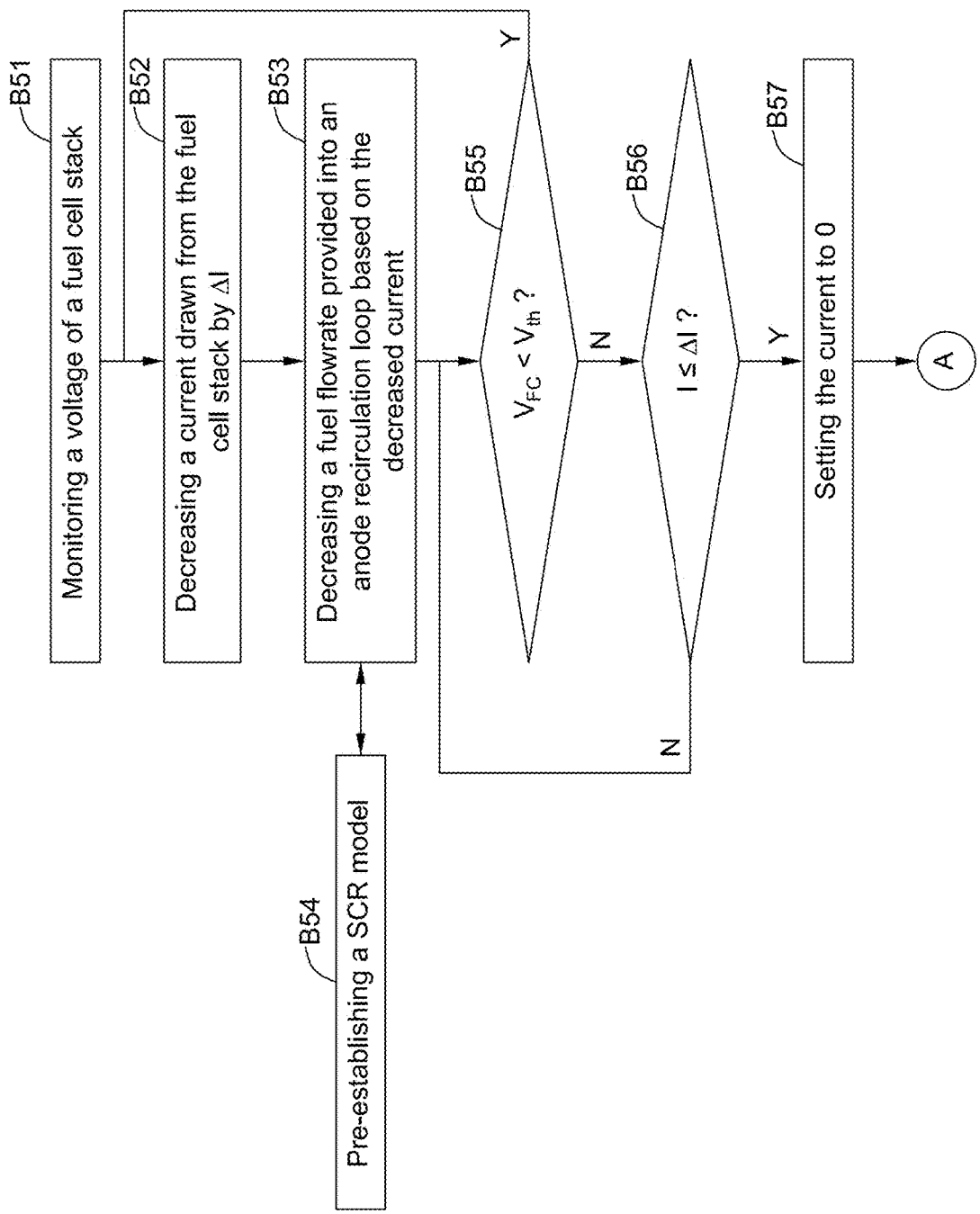
FIG. 5 is a flow chart of the former part of an exemplary shutdown method for a fuel cell system in accordance with an embodiment of the present disclosure.

FIG. 5 illustrates a flow chart of the former part of a shutdown method for the fuel cell system 200 in accordance with an embodiment of the present disclosure. As shown in FIG. 5, in block B51, during operation of the fuel cell system 200, a voltage $V_{FC}$ of the fuel cell stack 12 may be monitored in real time, for example, by using a voltage monitoring device 21. The voltage $V_{FC}$ of the fuel cell stack 12 may indicate health status of the anode 121 of the fuel cell stack 12.

Whenever the voltage $V_{FC}$ of the fuel cell stack 12 drops below a predetermined voltage threshold $V_{th}$, which means that the anode 121 of the fuel cell stack 12 will occur oxidation, the process may go to block B52. The predetermined voltage threshold $V_{th}$ may be the nickel-nickel oxide equilibrium point with an operating margin. For example, the predetermined voltage threshold $V_{th}$ may range from 0.55V to 0.65V.

Whenever the voltage $V_{FC}$ of the fuel cell stack 12 drops below the predetermined voltage threshold $V_{th}$, an air flowrate $Q_{air}$ of air provided to the cathode 122 of the fuel cell stack 12 may be kept constant.

In block B52, a current I drawn from the fuel cell stack 12 may be decreased by a predetermined amount ΔI, for example 5A, and then the process may go to block B53.

In block B53, a fuel flowrate $Q_{fuel}$ of a fuel provided to the anode recirculation loop 11 may be decreased correspondingly based on the decreased current so as to maintain a steam to carbon ratio (SCR) in the anode recirculation loop 11 above a predetermined steam to carbon ratio (SCR) limit $SCR_{limit}$. The predetermined SCR limit $SCR_{limit}$ may be between 2:1 and 5:1. For example, the predetermined SCR limit $SCR_{limit}$ may be 2.55.

As an example, in block B54, a steam to carbon ratio (SCR) model 220 may be pre-established in advance. The SCR model 220 may define relationship which maps the SCR in the anode recirculation loop 11 from the fuel flowrate $Q_{fuel}$ provided to the anode recirculation loop 11, the steam flowrate $Q_{steam}$ supplied to the anode recirculation loop 11, the current I drawn from the fuel cell stack 12, and a temperature $T_{stack}$ of the fuel cell stack 12. In block B53, a decreased fuel flowrate demand may be firstly determined from the SCR model 220 in block B54 according to the decreased current, and then the fuel flowrate $Q_{fuel}$ may be regulated correspondingly according to the decreased fuel flowrate demand.

Whenever the voltage $V_{FC}$ of the fuel cell stack 12 drops below the predetermined voltage threshold $V_{th}$, the steam flowrate $Q_{steam}$ supplied to the anode recirculation loop 11 may be kept constant. In an optional embodiment with sufficient steam supply, the steam flowrate $Q_{steam}$ supplied to the anode recirculation loop 11 may be also increased. Under this circumstance, block B53 may maintain the SCR in the anode recirculation loop 11 above the predetermined SCR limit $SCR_{limit}$ by both decreasing the fuel flowrate $Q_{fuel}$ and increasing the steam flowrate $Q_{steam}$.

In addition, whenever the voltage $V_{FC}$ of the fuel cell stack 12 drops below the predetermined voltage threshold $V_{th}$, a differential pressure between the anode 121 and the cathode 122 may be maintained in a predetermined pressure range, for example above 3 kpa.

After the current I drawn from the fuel cell stack 12 is decreased by the predetermined amount ΔI, the voltage $V_{FC}$ of the fuel cell stack 12 may be increased correspondingly, and the process may then continue to block B55 to determine whether the voltage $V_{FC}$ of the fuel cell stack 12 is still below the predetermined voltage threshold $V_{th}$. If the determined result is yes, the process may return to block B52. That is to say, when the voltage $V_{FC}$ of the fuel cell stack 12 is still below the predetermined voltage threshold $V_{th}$, block B52 and block B53 may be repeated until the voltage $V_{FC}$ of the fuel cell stack 12 is larger than or equal to the predetermined voltage threshold $V_{th}$. If the determined result in block B55 is no, the process may go to block B56.

Block B56 may determine whether the current I drawn from the fuel cell stack 12 is less than or equal to the predetermined amount I. When the current I is still larger than the predetermined amount ΔI, the process may return to block B55 and continue to wait until the voltage $V_{FC}$ of the fuel cell stack 12 drops below the predetermined voltage threshold $V_{th}$. When the current I is less than or equal to the predetermined amount ΔI, the process may go to block B57.

In block B57, the current I drawn from the fuel cell stack 12 may be directly set to be zero.

Figure 6:
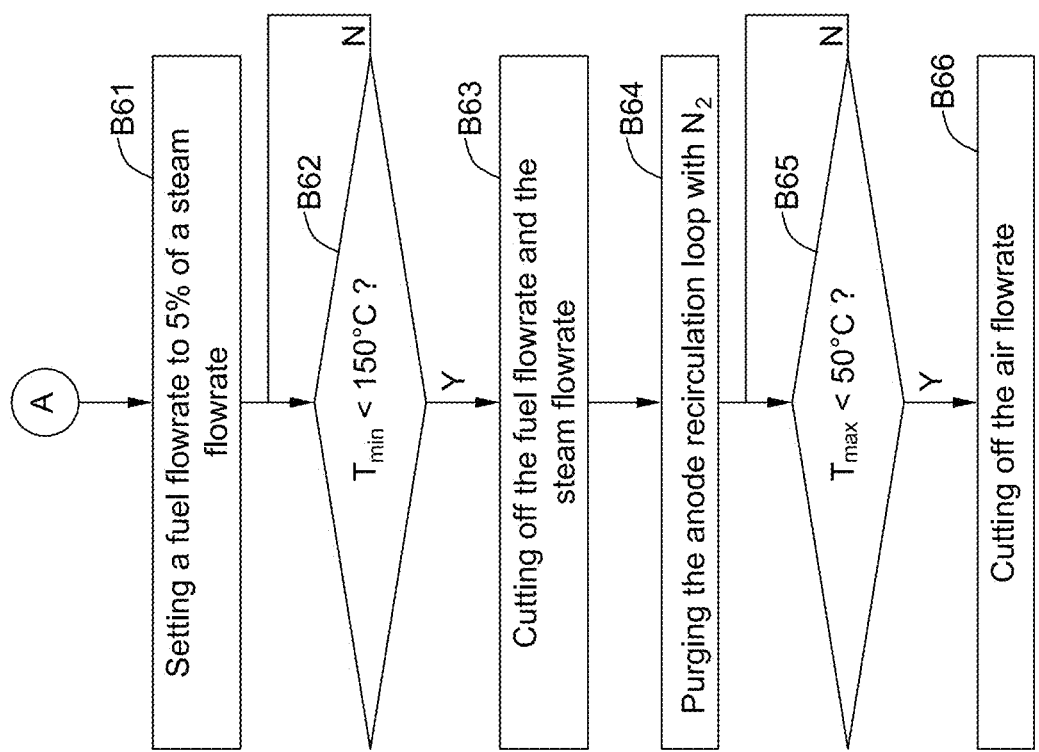
FIG. 6 is a flow chart of the latter part of an exemplary shutdown method for a fuel cell system in accordance with an embodiment of the present disclosure.

FIG. 6 illustrates a flow chart of the latter part of the shutdown method for the fuel cell system 200 in accordance with an embodiment of the present disclosure. Hereinafter, the subsequent shutdown operation of the fuel cell system 200 after the current I is decreased to be zero will be described in detail with reference to FIG. 6.

In block B61 of FIG. 6, the fuel flowrate $Q_{fuel}$ provided to the anode recirculation loop 11 may be set to be five percent (5%) of the steam flowrate $Q_{steam}$ provided to the anode recirculation loop 11, and the process may then go to block B62.

Block B62 may determine whether a minimal temperature $T_{min}$ measured in the anode recirculation loop 11 is lower than 150° C. If the determined result is yes, the process may go to block B63. If the determined result is no, the process may return to block B62 and continue to wait until the minimal temperature $T_{min}$ in the anode recirculation loop 11 is lower than 150° C.

In block B63, the fuel flowrate $Q_{fuel}$ and the steam flowrate $Q_{steam}$ which are provided to the anode recirculation loop 11 may be cut off, and the process may then go to block B64.

In block B64, the anode recirculation loop 11 may be purged using safety gas, for example nitrogen ($N_2$), and the process may then go to block B65.

Block B65 may determine whether the maximal temperature $T_{min}$ measured in the anode recirculation loop 11 is lower than 50° C. If the determined result is no, the process may return to block B65 and continue to wait until the maximal temperature $T_{min}$ measured in the anode recirculation loop 11 is lower than 50° C. When the maximal temperature $T_{min}$ measured in the anode recirculation loop 11 is lower than 50° C., the process may go to block B66.

In block B66, the air flowrate $Q_{air}$ provided to the cathode 122 of the fuel cell stack 12 may be cut off, and the fuel cell system 200 is in an offline state.

Figure 7:
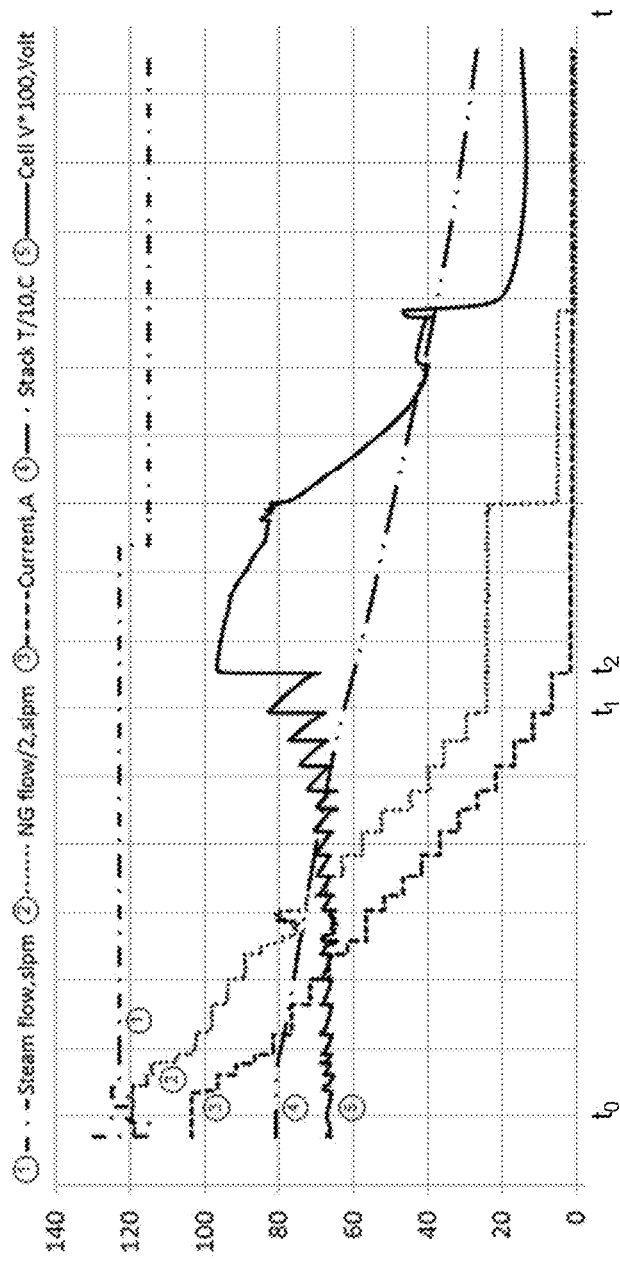
FIG. 7 is an effect view of the shutdown method for the fuel cell system in accordance with an implementing case of the present disclosure.

FIG. 7 illustrates an effect view of the shutdown method in accordance with an implementing case of the present disclosure. In FIG. 7, the X axis is the time unit and the Y axis has different units for different curves ①-⑤. Curve ① represents the steam flowrate supplied to the anode recirculation loop with unit of slpm (standard liter per minute). In this implementing case, the steam flowrate is limited due to pipe clog in the steam line, which means that the steam flowrate could be not increased during the shutdown process. Curve ② represents the natural gas (NG) flowrate provided to the anode recirculation loop with unit of slpm, and in FIG. 7, "NG flow/2", which means half of the NG flowrate, is used to show the NG flowrate curve for display purpose. Curve ③ represents the current drawn from the fuel cell stack with unit of Ampere. Curve ④ represents the temperature of the fuel cell stack with unit of Celcius, and in FIG. 7, "Stack T/10", which means 1/10 of the temperature reading of the fuel cell stack, is used to show the temperature curve of the fuel cell stack for display purpose. Curve ⑤ represents the voltage of the fuel cell stack with unit of Volt, and in FIG. 7, "Cell V*100", which means 100 times of the voltage of the fuel cell stack, is used to show the voltage curve of the fuel cell stack for display purpose.

As shown in FIG. 7, from time $t_0$ to time $t_1$, the steam flowrate keeps constant due to steam generation system fault in the fuel cell system. Under this circumstance, the current drawn from the fuel cell stack is stepping down once the voltage of the fuel cell stack goes below the predetermined voltage threshold, for example 0.65V in this implementing case. With decrease of the current, the voltage of the fuel cell stack is increased. In order to prevent carbon deposition in the anode of the fuel cell stack, the NG flowrate decreases following by the decreased current accordingly so as to maintain the SCR in the anode recirculation loop greater than the predetermined SCR limit, for example 2.5 in this implementing case. As the current and the NG flowrate drops, the temperature of the fuel cell stack drops gradually. When the time comes to $t_1$, the NG flowrate holds at the predefined minimal NG flowrate to maintain reducing environment in the anode chamber. At time $t_2$, when the current drawn from the fuel cell stack is less than or equal to the predetermined amount, for example 5A in this implementing case, the current is directly set to be zero.

The shutdown method of the present disclosure may monitor the voltage $V_{FC}$ of the fuel cell stack 12 in real time, and whenever the voltage $V_{FC}$ of the fuel cell stack 12 drops below the predetermined voltage threshold $V_{th}$, decrease the current I drawn from the fuel cell stack 12 by the predetermined amount $\Delta I$ so as to maintain the voltage $V_{FC}$ of the fuel cell stack 12 above the predetermined voltage threshold $V_{th}$, and decrease the fuel flowrate $Q_{fuel}$ correspondingly based on the decreased current so as to control the SCR in the anode recirculation loop 11. The shutdown method of the present disclosure may effectively protect the anode 121 of the fuel cell stack 12 from oxidation and prevent carbon deposition during the shutdown, and enable the fuel cell system 200 to have low operating cost without any additional reducing gas supply.

While steps of the shutdown method for the fuel cell system 200 in accordance with embodiments of the present disclosure are illustrated as functional blocks, the order of the blocks and the separation of the steps among the various blocks shown in FIGS. 5 and 6 are not intended to be limiting. For example, the blocks may be performed in a different order and a step associated with one block may be combined with one or more other blocks or may be subdivided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A fuel cell system comprising:
   an anode recirculation loop, wherein the anode recirculation loop comprises a fuel cell stack configured for generating power and having an anode and a cathode;
   a fuel supply device for providing a fuel to the anode recirculation loop; an air supply device for providing air to the cathode of the fuel cell stack; a voltage monitoring device for monitoring a voltage of the fuel cell stack; and
   an anode protection controller, wherein the anode protection controller decreases a current drawn from the fuel cell stack by a predetermined amount whenever the voltage of the fuel cell stack drops below a predetermined voltage threshold and decreases a fuel flowrate of the fuel provided to the anode recirculation loop based on the decreased current, so as to maintain a steam to carbon ratio in the anode recirculation loop above a predetermined steam to carbon ratio limit.

2. The fuel cell system of claim 1, wherein when the voltage of the fuel cell stack is larger than or equal to the predetermined voltage threshold and the current is still larger than the predetermined amount, the anode protection controller waits until the voltage of the fuel cell stack drops below the predetermined voltage threshold and the current is less than or equal to the predetermined amount to set the current to be zero.

3. The fuel cell system of claim 1, further comprising:
a steam supply device for supplying steam for fuel reforming to the anode recirculation loop.

4. The fuel cell system of claim 3, wherein the anode protection controller further increases a steam flowrate of the steam supplied to the anode recirculation loop whenever the voltage of the fuel cell stack drops below the predetermined voltage threshold.

5. The fuel cell system of claim 3, wherein the anode protection controller comprises:
a steam to carbon ratio model, wherein the anode protection controller determines a decreased fuel flowrate demand from the steam to carbon ratio model according to the decreased current.

6. The fuel cell system of claim 5, wherein the steam to carbon ratio model defines relationship which maps the steam to carbon ratio in the anode recirculation loop from the fuel flowrate provided to the anode recirculation loop, the steam flowrate supplied to the anode recirculation loop, the current drawn from the fuel cell stack, and a temperature of the fuel cell stack.

7. The fuel cell system of claim 6, wherein when the temperature of the fuel cell stack is higher than a predetermined temperature, if the current drawn from the fuel cell stack is larger than zero and the steam flowrate supplied to the anode recirculation loop is zero, the steam to carbon ratio in the anode recirculation loop in the steam to carbon ratio model is in association with the fuel flowrate provided to the anode recirculation loop and the current drawn from the fuel cell stack.

8. The fuel cell system of claim 6, wherein when the temperature of the fuel cell stack is higher than a predetermined temperature, if the current drawn from the fuel cell stack is larger than zero and the steam flowrate supplied to the anode recirculation loop is larger than zero, the steam to carbon ratio in the anode recirculation loop in the steam to carbon ratio model is in association with the fuel flowrate provided to the anode recirculation loop, the steam flowrate supplied to the anode recirculation loop and the current drawn from the fuel cell stack.

9. The fuel cell system of claim 6, wherein when the temperature of the fuel cell stack is higher than a predetermined temperature, if the current drawn from the fuel cell stack is zero and the steam flowrate supplied to the anode recirculation loop is larger than zero, the steam to carbon ratio in the anode recirculation loop in the steam to carbon ratio model is in association with the fuel flowrate provided to the anode recirculation loop, the steam flowrate supplied to the anode recirculation loop and the temperature of the fuel cell stack.

10. The fuel cell system of claim 6, wherein when the temperature of the fuel cell stack is lower than a predetermined temperature, the steam to carbon ratio in the anode recirculation loop in the steam to carbon ratio model is in association with the fuel flowrate provided to the anode recirculation loop and the steam flowrate supplied to the anode recirculation loop.

11. The fuel cell system of claim 1, wherein the anode protection controller further maintains a differential pressure between the anode and the cathode in a predetermined pressure range whenever the voltage of the fuel cell stack drops below the predetermined voltage threshold.

12. The fuel cell system of claim 1, wherein the anode of the fuel cell stack has an anode inlet and an anode outlet, and the anode recirculation loop further comprises:
a fuel reformer for receiving the fuel and a tail gas from the anode outlet of the fuel cell stack and generating a reformate, wherein at least one portion of the reformate is returned to the anode inlet of the fuel cell stack.

\* \* \* \* \*